(12) United States Patent
Suzuki et al.

(10) Patent No.: US 6,606,673 B2
(45) Date of Patent: Aug. 12, 2003

(54) DIRECT MEMORY ACCESS TRANSFER APPARATUS

(75) Inventors: Hirokazu Suzuki, Tokyo (JP); Toshihisa Kamemaru, Tokyo (JP); Hideo Ohira, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 375 days.

(21) Appl. No.: 09/757,472

(22) Filed: Jan. 11, 2001

(65) Prior Publication Data

US 2001/0007454 A1 Jul. 12, 2001

(30) Foreign Application Priority Data

Jan. 12, 2000 (JP) ...................................... 2000-003828

(51) Int. Cl.$^7$ ............................................... G06F 13/00
(52) U.S. Cl. ............................... 710/22; 710/22; 711/5; 345/537
(58) Field of Search ................................. 345/531–538; 710/22–28; 711/5, 105–112

(56) References Cited

U.S. PATENT DOCUMENTS

| 5,291,582 | A | * | 3/1994 | Drako et al. .................. 710/26 |
| 5,623,624 | A | * | 4/1997 | Holland et al. ............. 711/105 |
| 5,737,587 | A | * | 4/1998 | Leung et al. ................ 713/401 |
| 5,816,921 | A | * | 10/1998 | Hosokawa .................... 463/43 |
| 6,025,854 | A | * | 2/2000 | Hinz et al. .................. 345/538 |
| 6,108,746 | A | * | 8/2000 | Fujita et al. ................... 711/5 |
| 6,223,193 | B1 | * | 4/2001 | Pau et al. .................... 708/300 |
| 6,397,386 | B1 | * | 5/2002 | O'Connor et al. ............ 725/39 |

FOREIGN PATENT DOCUMENTS

| JP | 334658 | 2/1988 |
| JP | 372039 | 12/1992 |
| JP | 324536 | 12/1993 |

\* cited by examiner

*Primary Examiner*—Christopher B. Shin
(74) *Attorney, Agent, or Firm*—Birch, Stewart, Kolasch & Birch, LLP

(57) ABSTRACT

Two-dimensional addresses of lateral lines of a rectangular area are produced in a prescribed scanning order in a sender-memory control unit as readout addresses of a sender's memory, pieces of pixel data corresponding to the readout addresses are read out from the sender's memory, the pieces of pixel data read out are sub-sampled at a sample ratio of n:1 in a direction of each lateral line according to a quincunx method in a data transforming unit, two-dimensional write addresses of a receiver's memory are produced in a receiver-memory control unit, and pieces of sub-sampled pixel data are written in the receiver's memory. Accordingly, the pieces of pixel data can be sub-sampled and transferred at a high speed in a DMA transfer apparatus.

8 Claims, 8 Drawing Sheets

FIG.7A

```
XOXOXOXOXOXOXOXO
OXOXOXOXOXOXOXOX
XOXOXOXOXOXOXOXO
OXOXOXOXOXOXOXOX
XOXOXOXOXOXOXOXO
OXOXOXOXOXOXOXOX
XOXOXOXOXOXOXOXO
OXOXOXOXOXOXOXOX
```

FIG.7B

```
OXOXOXOXOXOXOXOX
OXOXOXOXOXOXOXOX
XOXOXOXOXOXOXOXO
XOXOXOXOXOXOXOXO
OXOXOXOXOXOXOXOX
OXOXOXOXOXOXOXOX
XOXOXOXOXOXOXOXO
XOXOXOXOXOXOXOXO
```

FIG.7C

```
OXOXOXOXOXOXOXOX
OXOXOXOXOXOXOXOX
OXOXOXOXOXOXOXOX
OXOXOXOXOXOXOXOX
OXOXOXOXOXOXOXOX
OXOXOXOXOXOXOXOX
OXOXOXOXOXOXOXOX
OXOXOXOXOXOXOXOX
```

FIG.8A

```
OXXXOXXXOXXXOXXX
OXXXOXXXOXXXOXXX
OXXXOXXXOXXXOXXX
OXXXOXXXOXXXOXXX
OXXXOXXXOXXXOXXX
OXXXOXXXOXXXOXXX
OXXXOXXXOXXXOXXX
OXXXOXXXOXXXOXXX
```

FIG.8B

```
OXXXOXXXOXXXOXXX
XOXXXOXXXOXXXOXX
XXOXXXOXXXOXXXOX
XXXOXXXOXXXOXXXO
OXXXOXXXOXXXOXXX
XOXXXOXXXOXXXOXX
XXOXXXOXXXOXXXOX
XXXOXXXOXXXOXXXO
```

US 6,606,673 B2

DIRECT MEMORY ACCESS TRANSFER APPARATUS

BACKGROUND OF THE INVENTION

1. Field of the Invention

The present invention relates to a direct memory access transfer apparatus in which a data transfer between memories are directly performed through no central processing unit to process a large amount of picture data (or pixel data) relating to motion search or picture characteristic calculation performed in a picture processing system.

2. Description of Related Art

FIG. 10 is a block diagram showing the configuration of a picture processing system having a conventional direct memory access transfer apparatus. In FIG. 10, 100 indicates a memory of a data sender. 101 indicates a memory of a data receiver. 102 indicates a central processing unit (CPU). 103 indicates a conventional direct memory access (DMA) transfer apparatus. 104 indicates an address bus. 105 indicates a data bus.

Next, an operation of a picture processing system is described.

The case where picture data stored in the sender's memory 100 is sent to the receiver's memory 101 is, for example, described. A start address of the sender's memory 100, a start address of the receiver's memory 101 and the amount of data to be transferred is sent from the CPU 102 to the conventional DMA transfer apparatus 103, and an operation of the conventional DMA transfer apparatus 103 is started. In this operation of the conventional DMA transfer apparatus 103, a readout address of the sender's memory 100 is output to an address bus 104, and a readout signal is output from the conventional DMA transfer apparatus 103 to the sender's memory 100. Thereafter, pixel data corresponding to the readout address in the sender's memory 100 is output from the sender's memory 100 to the data bus 105.

The pixel data output to the data bus 105 is temporarily stored in a buffer of the conventional DMA transfer apparatus 103. Thereafter, a write address of the receiver's memory 101 is output from the conventional DMA transfer apparatus 103 to the address bus 104, and a write signal is output from the conventional DMA transfer apparatus 103 to the receiver's memory 101. Thereafter, the pixel data stored in the buffer of the conventional DMA transfer apparatus 103 is output to the data bus 105, and the pixel data output to the data bus 105 is stored in an area of the receiver's memory 101 indicated by the write address. Therefore, a data transfer between the sender's memory 100 and the receiver's memory 101 can be performed in the picture processing system according to the above-described processing.

For example, the case where a motion search processing in a picture coding is performed in the picture processing system is considered. In this processing, for a rectangular area of 16*16 pixels, all integral-numbered pixels placed from the −16-th relative pixel position to the +15-th relative pixel position are searched in the lateral and longitudinal directions. In this case, when a picture screen size having 352 (16*22) pixels in the lateral direction and 288 (16*18) pixels in the longitudinal direction is set at a frame rate of 30 Hz, the number of additions of differential absolute values between pixels required for every second is expressed according to a following equation.

(frame rate)*(the number of rectangular areas in one screen)*(the number of pixels in one rectangular area)*(the number of search operations)=30*(22*18)*16*16*(15+16+1)$^2$≈3*10$^9$ To reduce a large number of addition operations expressed by the above equation, a following approximation calculation is generally known. In this approximation calculation, the pixels of each rectangular area are, for example, sub-sampled at the sample ratio of 2:1 according to a quincunx method to halve the number of additions of differential absolute values.

FIG. 11 is a conceptual view showing a sub-sampling performed at the sample ratio of 2:1 according to the quincunx method. As shown in FIG. 11, a group of pieces of pixel data of pixels arranged at even-numbered positions of one lateral line and a group of pieces of pixel data of pixels arranged at odd-numbered positions of another lateral line are alternately sampled for every lateral line.

This approximation calculation is not limited to the motion search. That is, in cases where a dispersed value of pixels of each rectangular area is calculated as a parameter indicating a characteristic of the rectangular area, an approximation calculation can be performed by sampling pieces of pixel data of the rectangular area at the sample ratio of 2:1 according to the quincunx method.

However, because the conventional DMA transfer apparatus has the above configuration, the conventional DMA transfer apparatus has no circuit mechanism in which pieces of pixel data are sub-sampled to reduce the number of calculations. Therefore, in cases where pieces of pixel data are, for example, sub-sampled at the sample ratio of 2:1 shown in FIG. 11, it is required to perform the sub-sampling of the pixel data according to a software processing performed in the CPU 102. In this case, there is a problem that it takes a lot of time to perform the sub-sampling of the pixel data according to the software processing.

Also, in cases where the data transfer operation is performed for every pixel (for example, for every 8 bits) and an address producing method is adapted to the data transfer operation, a data sub-sampling and the transfer of sub-sampled data can be performed in the conventional DMA transfer apparatus. However, it is required to read pixel data from the sender's memory 100 for every pixel. Therefore, there is another problem that it takes a lot of time to transfer a large amount of pixel data.

SUMMARY OF THE INVENTION

An object of the present invention is to provide, with due consideration to the drawbacks of the conventional DMA transfer apparatus, a direct memory access transfer apparatus in which pieces of pixel data read out from a memory of a data sender are transferred to a memory of a data receiver at a high speed on condition that the accessing of the pieces of pixel data to each of the memories is possible at one time.

The object is achieved by the provision of a direct memory access transfer apparatus, in which pieces of pixel data are transferred between a sender's memory, to which the accessing of pieces of pixel data is possible at one time, a receiver's memory to which the accessing of pieces of pixel data is possible at one time, comprising a group of transfer parameter registers for storing a plurality of parameters required to transfer address data of both the sender's memory and the receiver's memory, a sender-memory control unit for producing a plurality of two-dimensional readout addresses of the sender's memory according to the parameters stored in the group of transfer parameter registers and reading out pieces of pixel data corresponding to pixels arranged on a plurality of lateral lines of a rectangular area from the sender's memory according to the two-dimensional readout addresses of the sender's memory, a data transforming unit for performing a sub-sampling for the pieces of pixel data of each lateral line read out from the sender's memory by the sender-memory control unit at a sample ratio of n:1 (n is an integral number higher than 1) and outputting pieces of sub-sampled pixel data corresponding to each lateral line, a receiver-memory control unit for producing a plurality of two-dimensional write addresses of the receiver's memory according to the parameters stored in the group of transfer parameter registers and write the pieces of sub-sampled pixel data of the lateral lines produced by the data transforming unit in the two-dimensional write addresses of the receiver's memory, and a timing control unit for controlling a processing timing of the sender-memory control unit, a processing timing of the data transforming unit and a processing timing of the receiver-memory control unit.

In the above configuration, pieces of pixel data are read out from the sender's memory at one time under the control of the sender-memory control unit, the pieces of pixel data are sub-sampled in the data transforming unit to produce pieces of sub-sampled pixel data, and the pieces of sub-sampled pixel data are written in the receiver's memory under the control of the receiver-memory control unit.

Accordingly, the pieces of pixel data can be sub-sampled and transferred at a high speed in a DMA transfer apparatus.

Also, because the pieces of pixel data read out from the sender's memory are sub-sampled in the data transforming unit, the sub-sampling processing for the pieces of pixel data can be performed at a high speed.

It is preferred that the sub-sampling is performed by the data transforming unit according to a quincunx method in which positions of pixels corresponding to the pieces of sub-sampled pixel data of each even-numbered lateral line differ from those corresponding to the pieces of sub-sampled pixel data of each odd-numbered lateral line.

Accordingly, the sub-sampling of pieces of pixel data of pixels placed at fixed longitudinal rows of the rectangular area can be prevented in the direct memory access transfer apparatus.

It is also preferred that sample mode information indicating the performance of a sub-sampling or a full sampling for the pieces of pixel data read out from the sender's memory is stored in the group of transfer parameter registers, and the sub-sampling or the full sampling is performed for the pieces of pixel data read out from the sender's memory by the data transforming unit according to the sample mode information stored in the group of transfer parameter registers.

Accordingly, the sub-sampling or the full sampling can be selected.

It is also preferred that the sender-memory control unit comprises an address calculating circuit for calculating each of the readout addresses of the sender's memory according to the parameters stored in the group of transfer parameter registers, a register for storing the readout addresses calculated in the address calculating circuit, and an output control circuit for outputting the readout addresses stored in the register and a readout signal, which indicates the readout of the pieces of pixel data stored in the sender's memory, according to an instruction sent from the timing control unit.

Accordingly, the readout addresses of the sender's memory can be obtained, and the pieces of pixel data corresponding to the readout addresses can be read out from the sender's memory.

It is also preferred that the receiver-memory control unit comprises an address calculating circuit for calculating each of the write addresses of the receiver's memory according to the parameters stored in the group of transfer parameter registers, a register for storing the write addresses calculated in the address calculating circuit, and an output control circuit for outputting the write addresses stored in the register and a write signal, which indicates the writing of the pieces of sub-sampled pixel data produced by the data transforming unit, according to an instruction sent from the timing control unit.

Accordingly, the write addresses of the receiver's memory can be obtained, and the pieces of sub-sampled pixel data can be written in the write addresses of the receiver's memory.

It is also preferred that the data transforming unit comprises a register for storing the pieces of pixel data read out from the sender's memory according to an instruction sent from the timing control unit, a sub-sampling circuit for performing the sub-sampling or the full sampling for the pieces of pixel data stored in the register according to the sample mode information stored in the group of transfer parameter registers to produce pieces of sampled pixel data and transforming the pieces of sampled pixel data into a piece of a combined pixel data corresponding to the lateral line according to an instruction sent from the timing control unit, and an output control circuit for outputting the combined pixel data of the lateral line transformed in the sub-sampling circuit according to an instruction sent from the timing control unit.

Accordingly, the sub-sampling or the full sampling for the pieces of pixel data can be performed for every lateral line, and the pieces of sampled pixel data can be output as the combined pixel data for every lateral line.

It is also preferred that the data transforming unit comprises a register for storing the pieces of pixel data read out from the sender's memory according to an instruction sent from the timing control unit, an odd-even judging circuit for judging according to an instruction sent from the timing control unit whether the lateral line of the pixels in the rectangular area is an odd-numbered line or an even-numbered line, a sub-sampling circuit for performing the sub-sampling for the pieces of pixel data stored in the register in a quincunx method according to a judging result obtained in the odd-even judging circuit and the sample mode information stored in the group of transfer parameter registers to produce pieces of sampled pixel data and transforming the pieces of sampled pixel data into a piece of a combined pixel data corresponding to the lateral line according to an instruction sent from the timing control unit, and an output control circuit for outputting the combined pixel data of the lateral line transformed in the sub-sampling circuit according to an instruction sent from the timing control unit.

Accordingly, the sub-sampling for the pieces of pixel data can be performed according to the quincunx method by alternately selecting a group of pieces of pixel data corresponding to one odd-numbered lateral line and a group of pieces of pixel data corresponding to one even-numbered lateral line.

It is also preferred that the sub-sampling is performed by the data transforming unit according to a quincunx method to place pixels corresponding to the pieces of sub-sampled pixel data of one group of lateral lines at even-numbered positions on each lateral line and to place pixels corresponding to the pieces of sub-sampled pixel data of the other group of lateral lines at even-numbered positions on each lateral line.

Accordingly, the sub-sampling of pieces of pixel data of pixels placed at fixed longitudinal rows of the rectangular area can be prevented in the direct memory access transfer apparatus.

BRIEF DESCRIPTION OF THE DRAWINGS

FIG. 7A is a conceptual view showing a first example of a sub-sampling method performed at a sample ratio of 2:1 according to the first embodiment of the present invention;

FIG. 7B is a conceptual view showing a second example of the sub-sampling method performed at the sample ratio of 2:1 according to the first embodiment of the present invention;

FIG. 7C is a conceptual view showing a third example of the sub-sampling method performed at the sample ratio of 2:1 according to the first embodiment of the present invention;

FIG. 8A is a conceptual view showing a first example of a sub-sampling method performed at a sample ratio of 4:1 according to the first embodiment of the present invention;

FIG. 8B is a conceptual view showing a second example of the sub-sampling method performed at the sample ratio of 4:1 according to the first embodiment of the present invention;

DETAILED DESCRIPTION OF THE PREFERRED EMBODIMENT

An embodiment of the present invention will now be described with reference to the accompanying drawings.

Embodiment 1

Figure 1:
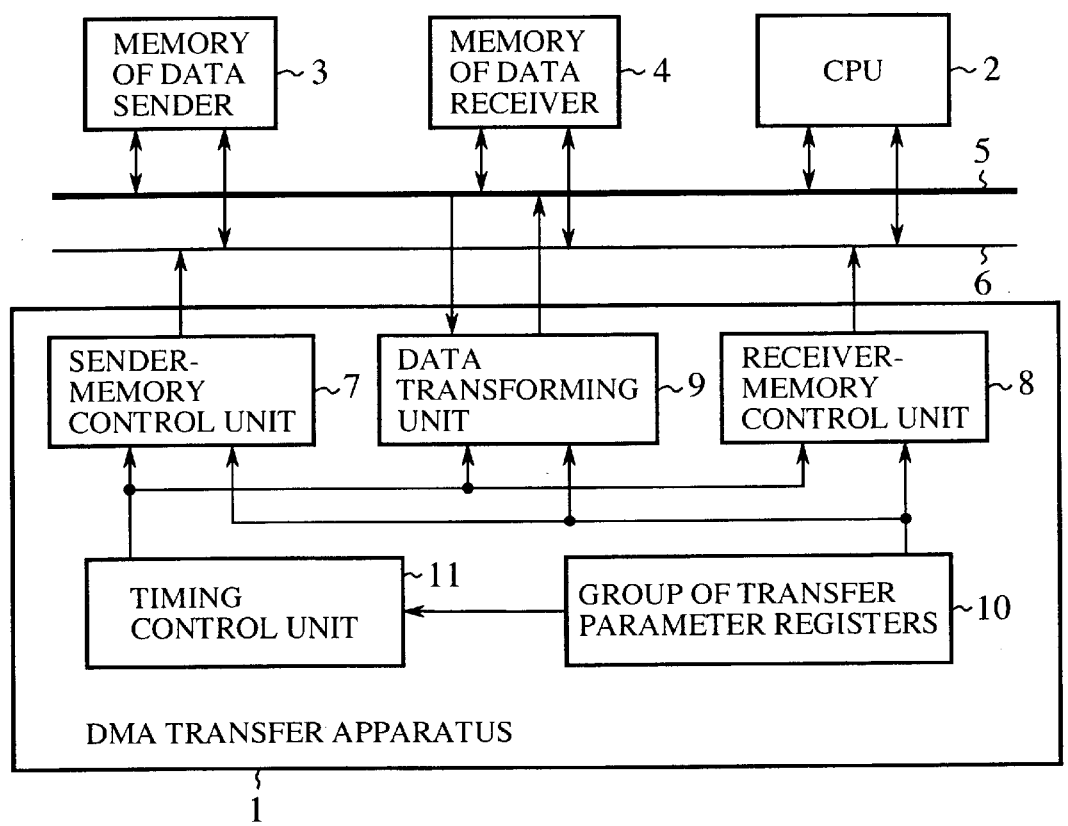
FIG. 1 is a block diagram showing the configuration of a picture processing system having a direct memory access transfer apparatus according to a first embodiment of the present invention.

FIG. 1 is a block diagram showing the configuration of a picture processing system having a direct memory access transfer apparatus according to a first embodiment of the present invention. In FIG. 1, 1 indicates a direct memory access (DMA) transfer apparatus. 2 indicates a CPU for controlling a picture processing system. 3 indicates a memory of a data sender for storing pieces of 8-bit pixel data. The accessing of four pieces of 8-bit pixel data (that is, data of 32 bits) to the sender's memory at one time is possible. 4 indicates a memory of a data receiver. The accessing of sixteen pieces of 8-bit pixel data (that is, data of 128 bits) to the receiver's memory 4 at one time is possible. 5 indicates a data bus. The data bus 5 has a bus width corresponding to 128 bits. 6 indicates an address bus through which readout addresses or write addresses are supplied to the sender's memory 3 or the receiver's memory 4.

In the DMA transfer apparatus 1, 7 indicates a sender-memory control unit for producing an address control signal of the sender's memory 3. 8 indicates a receiver-memory control unit for producing an address control signal of the receiver's memory 4. 9 indicates a data transforming unit for repeatedly receiving four pieces of pixel data read out from the sender's memory 3, performing the sub-sampling for each group of the four pieces of pixel data at the sample ratio of 2:1 according to the quincunx method to select two pieces of sub-sampled 8-bit pixel data for each group, producing 128-bit data from sixteen pieces of sub-sampled 8-bit pixel data corresponding to eight groups, and outputting the 128-bit data. 10 indicates a group of transfer parameter registers (called a transfer parameter register group) for storing a plurality of transfer parameters required to transfer readout addresses of the sender's memory 3 and write addresses of the receiver's memory 4 to the address bus 6. A top address of the sender's memory 3 and a start address of the receiver's memory 4 are, for example, stored as transfer parameters in the transfer parameter register group 10. 11 indicates a timing control unit for controlling an operation performed in the DMA transfer apparatus 1.

The transfer parameter register group 10 includes a register for storing sample mode information indicating whether a sub-sampling is performed for the four pieces of pixel data read out from the sender's memory 3 to transfer two pieces of sub-sampled pixel data or the four pieces of pixel data are transferred as it is without the sub-sampling. In cases where the sample mode information indicates the performance of the sub-sampling, the transfer parameter register group 10 specifies that a sub-sampling is performed for the four pieces of read-out pixel data at the sample ratio of 2:1 in the data transforming unit 9 to transfer two pieces of sub-sampled pixel data. In contrast, in cases where the sample mode information indicates the performance of a full sampling, the transfer parameter register group 10 specifies that the four pieces of read-out pixel data are transferred without the sub-sampling. Here, in this embodiment, pixel data of each pixel has a data length of 8 bits, and an address is allocated to each piece of pixel data.

Next, an operation of the picture processing system is described.

A plurality of transfer parameters, which are required to transfer readout addresses of the sender's memory 3 and write addresses of the receivers memory 4 to the address bus 6, are initially set in the transfer parameter register group 10 of the DMA transfer apparatus 1 under the control of the CPU 2. Thereafter, when a start signal is sent from the CPU 2 to the DMA transfer apparatus 1, readout addresses are calculated in the sender-memory control unit 7 and are output to the address bus 6. Also, a readout signal is produced with the readout addresses in the sender-memory control unit 7 and is output to the sender's memory 3.

When the readout signal is received in the sender's memory 3, pieces of pixel data corresponding to the readout addresses are output to the data bus 5. Thereafter, the pieces of pixel data output to the data bus 5 are fetched by the data transforming unit 9. Thereafter, in cases where the sample mode information of the transfer parameter register group 10 indicates the performance of the sub-sampling, a sub-sampling is performed in the data transforming unit 9 by thinning out pieces of pixel data at the sample ratio of 2:1. Thereafter, pieces of pixel data sub-sampled in the data transforming unit 9 are output to the data bus 5. Also, write addresses and a write signal are generated in the receiver-memory control unit 8 and are output to the receiver's memory 4. In the receiver's memory 4, the pieces of sub-sampled pixel data output to the data bus 5 are stored in an area indicated by the write addresses.

Figure 2:
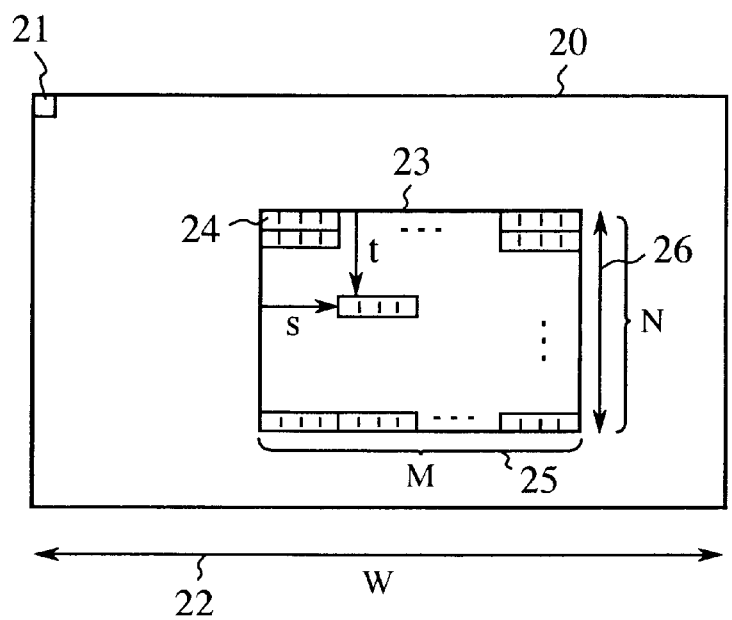
FIG. 2 is a conceptual view showing a method of calculating readout addresses of a sender's memory of the direct memory access transfer apparatus according to the first embodiment of the present invention.

FIG. 2 is a conceptual view showing a method of calculating readout addresses of the sender's memory 3. As shown in FIG. 2, 21 indicates a top pixel of a screen 20. The top pixel 21 is first scanned. All pixels of the screen 20 including the top pixel 21 are scanned in a prescribed scanning order, and pieces of pixel data of the pixels of the screen scanned in the prescribed scanning order are stored in addresses of the sender's memory 3 in one dimension. 22 indicates the number of pixels arranged on a line in the lateral direction, and the number of pixels is equal to W. 23 indicates a rectangular area in which pixels corresponding to pieces of pixel data to be currently transferred are arranged. 24 indicates a top pixel of the rectangular area 23, and an address of the top pixel 24 is expressed by Ak. Four pieces of pixel data of each group of four pixels consecutively arranged on the same line in the lateral direction are read out from the sender's memory 3, and each group of four pieces of pixel data denotes one word. In cases where the number 26 of lateral lines of the rectangular area 23 is set to N and the number 25 of words in each lateral line of the rectangular area 23 is set to M, a readout address Ast of a transfer word (that is, a group of four pieces of pixel data to be currently transferred), which is placed at the s-th position in the lateral direction and the t-th position in the longitudinal direction in the rectangular area 23, is calculated according to an equation (1).

$$Ast = Ak + W*t + 4*s$$

$$(s=0 \text{ to } M-1, t=0 \text{ to } N-1) \tag{1}$$

Therefore, when the numbers s and t defined in a two dimensional area are increased according to the prescribed scanning order, two-dimensional readout addresses Ast of the sender's memory 3 can be produced. To simplify the description of the readout address calculation, data transfer from the sender's memory 3 to the receiver's memory 4 is performed so as to write sixteen pieces of pixel data corresponding to one lateral line of the rectangular area 23 in the receiver's memory 4 at one time for every lateral line. Therefore, M=8 (corresponding to 32 pieces of pixel data) is set in case of the sub-sampling at the sample rate of 2:1, M=4 (corresponding to 16 pieces of pixel data) is set in case of the full sampling, and the sub-sampling or the full sampling is selected according to the sample mode information. The values Ak, W and N in the equation (1) and the sample mode information are pre-set as transfer parameters in the transfer parameter register group 10 before the operation start of the DMA transfer apparatus 1.

Also, to write 16 pieces of pixel data corresponding to one lateral line (that is, 128 bits) of the rectangular area 23 in the receiver's memory 4 for every lateral line, when a start address of the receiver's memory 4 is equal to Ad, because an address allocated for every 8 bits (corresponding to one piece of pixel data) is increased by 16 for every lateral line, a write address Ay of a y-th transfer lateral line (denoting a y-th lateral line corresponding to pixel data to be currently transferred) is calculated according to an equation (2).

$$Ay = Ad + 16*y \quad (y=0 \text{ to } N-1) \tag{2}$$

The start address Ad is pre-set in the transfer parameter register group 10 before the operation start of the DMA transfer apparatus 1.

Figure 3:
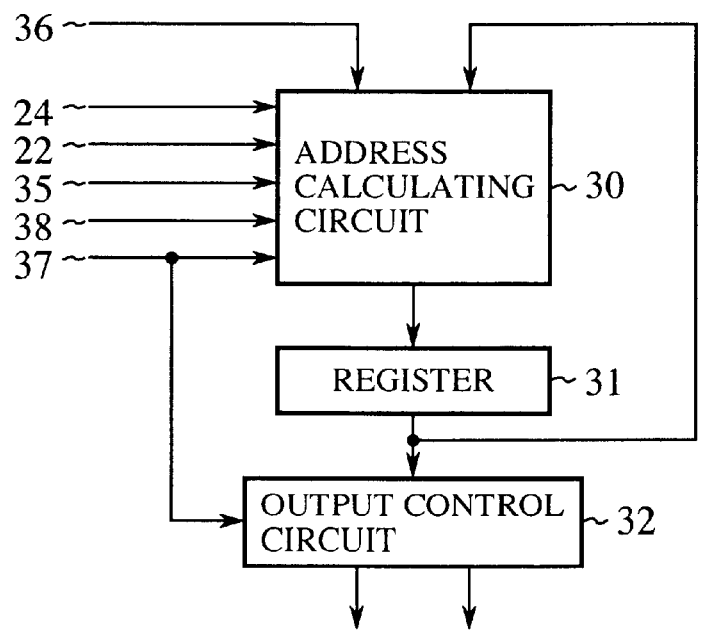
FIG. 3 is a block diagram showing the configuration of a sender-memory control unit of the direct memory access transfer apparatus according to the first embodiment of the present invention.

FIG. 3 is a block diagram showing the configuration of the sender-memory control unit 7. 30 indicates an address calculating circuit for calculating readout addresses of the sender's memory 3. 31 indicates a register for storing the readout addresses of the sender's memory 3 calculated in the address calculating circuit 30. 32 indicates an output control circuit for outputting the readout addresses stored in the register 31 to the sender's memory 3. A readout signal is output from the output control circuit 32 to the sender's memory 3 in synchronization with the output of the readout address.

24, 22 and 35 respectively denote a signal of a parameter set in the transfer parameter register group 10. In detail, 24 denotes the address Ak of the top pixel of the rectangular area 23 corresponding to pieces of pixel data to be currently transferred. 22 denotes the number W of pixels arranged on each lateral line in the lateral direction of the screen 20. 35 denotes the sample mode information. 36 denotes a start signal sent from the CPU 2 to start the operation of the sender-memory control unit 7. 37 and 38 denote control signals sent from the timing control unit 11. In detail, 37 denotes an output signal indicating both the renewal of one readout address and the output of the readout address. 38 denotes a renewal selecting signal. An address renewal corresponding to the lateral direction in the rectangular area 23 or an address renewal corresponding to the longitudinal direction in the rectangular area 23 is selected according to the renewal selecting signal.

As shown in FIG. 3, when a start signal 36 sent from the CPU 2 is received in the sender-memory control unit 7, the top address 24 of the rectangular area 23 relating to a transfer operation is stored in the register 31. The top address 24 indicates the readout address equal to Ak. Thereafter, when an output signal 37 sent from the timing control unit 11 is received in the sender-memory control unit 7, the readout address stored in the register 31 and a readout signal are output from the output control circuit 32. Thereafter, in cases where a renewal selecting signal 38 sent from the timing control unit 11 indicates an address renewal corresponding to the lateral direction, a new readout address, which is obtained by adding 4 to the output readout address, is stored in the register 31 in place of the output readout address. Also, in cases where a renewal selecting signal 38 sent from the timing control unit 11 indicates an address renewal corresponding to the longitudinal direction, a new readout address, which is obtained by adding a value of (W−4*(M−1)) to the output readout address, is stored in the register 31 in place of the output readout address. Here, the value (W−4*(M−1)) is obtained as the difference between a readout address Ast in case of t=$t_0$+1 ($t_0$ is an arbitral value ranging from 0 to N−2) and s=0 and an address Ast in case of t=$t_0$ and s=M−1 in the equation (1).

To produce readout addresses for one lateral line, after the start signal is received in the sender-memory control unit 7, the output signal 37 sent from the timing control unit 11 is repeatedly input to the sender-memory control unit 7 M times (that is, 8 times) to output M readout addresses of one lateral line calculated in the sender-memory control unit 7 to the address bus 6. In this case, the renewal selecting signal 38 indicates an address renewal corresponding to the lateral direction for each of the output signals 37 corresponding to the first to (M−1)-th sending, and the renewal selecting signal 38 indicates an address renewal corresponding to the longitudinal direction for the M-th output signal 37. Thereafter, when the writing of pieces of pixel data for one lateral line is completed in the receiver-memory control unit 8, the output signal 37 is again input from the timing control unit 11 to the sender-memory control unit 7 M times, and the renewal selecting signals 38 corresponding to the M output signals 37 are adjusted in the same manner. The sending of the M output signals 37 for one lateral line is repeated N times, so that the readout addresses of the sender's memory 3 calculated according to the equation (1) are produced.

Figure 4:
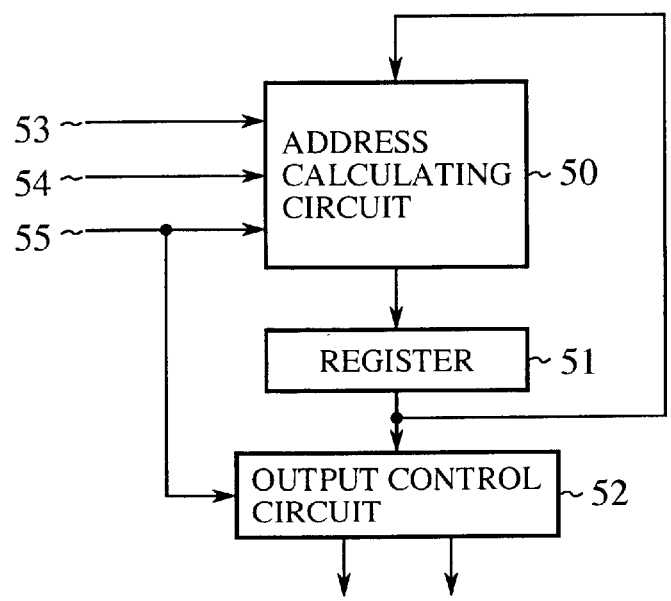
FIG. 4 is a block diagram showing the configuration of a receiver-memory control unit of the direct memory access transfer apparatus according to the first embodiment of the present invention.

FIG. 4 is a block diagram showing the configuration of the receiver-memory control unit 8. 50 indicates an address calculating circuit for calculating write addresses of the receiver's memory 4. 51 indicates a register for storing the write addresses of the receiver's memory 4 calculated in the address calculating circuit 50. 52 indicates an output control circuit for outputting the write addresses stored in the register 51 to the receiver's memory 4. A write signal is output from the output control circuit 52 to the receiver's memory 4 in synchronization with the output of the write addresses. 53 denotes a signal indicating a top address of the receiver's memory 4 which is pre-set in the transfer parameter register group 10. 54 indicates a start signal sent from the CPU 2 to start the operation of the receiver-memory control unit 8. 55 indicates an output instructing signal for instructing the output control circuit 52 to output a write address to the receiver's memory 4. The output instructing signal 55 is sent from the timing control unit 11.

When a start signal 54 sent from the CPU 2 is received in the receiver-memory control unit 8, a top address 53 sent from the transfer parameter register group 10 is stored in the register 51 as a write address. Thereafter, when an output instructing signal 55 output from the timing control unit 11 is received in the receiver-memory control unit 8, the write address stored in the register 51 and a write signal are output from the output control circuit 52, and a new write address, which is obtained by adding 16 to the output write address, is stored in the register 51 in place of the output write address. The outputting of the write address newly stored in the register 51 and a write signal is repeated. Therefore, the write addresses of the receiver's memory 4 calculated according to the equation (2) are produced.

Figure 5:
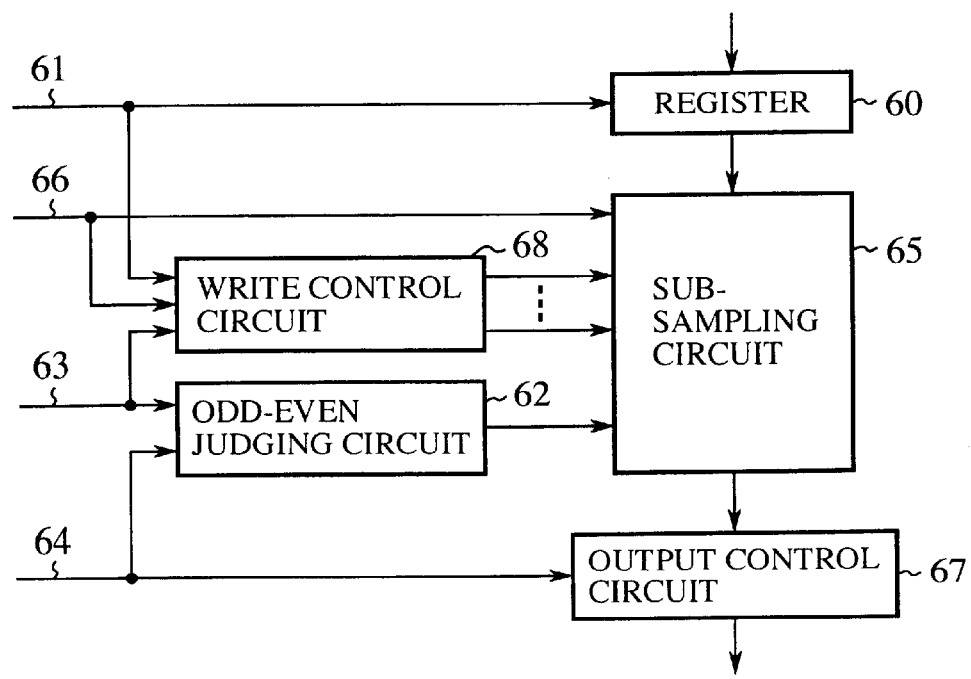
FIG. 5 is a block diagram showing the configuration of a data transforming unit of the direct memory access transfer apparatus according to the first embodiment of the present invention.

FIG. 5 is a block diagram showing the configuration of the data transforming unit 9. In FIG. 5, 60 indicates a register for storing four pieces of 8-bit pixel data output from the sender's memory 3 through the data bus 5 of the 128-bit width. 61 denotes a write control signal sent from the timing control unit 11 to control the register 60. 4*M pieces of pixel data corresponding to one lateral line are input to a sub-sample circuit 65 through the register 60 when the write control signal 61 is repeatedly input to the register 60 M times in synchronization with the four pieces of pixel data output from the sender's memory 3. 63 denotes a start signal sent from the CPU 2. The operation of the data transforming unit 9 is started in response to the start signal 63. 64 denotes an output instructing signal produced in the timing control unit 11. The output instructing signal 64 is input to the data transforming unit 9 each time the data transformation for 4*M pieces of pixel data corresponding to one lateral line is completed, so that N output instructing signals 64 are input to the data transforming unit 9.

Also, in FIG. 5, 62 indicates an odd-even judging circuit for producing an odd-even judging signal. The odd-even judging signal 62 indicates that a lateral line corresponding to 4*M pieces of pixel data currently transferred is an even-numbered (0, 2, 4, - - - ) line or an odd-numbered (1, 3, 5, - - - ) line. In cases where the odd-even judging signal 62 is set to a low level denoting "0", the odd-even judging signal 62 indicates an even-numbered lateral line. In contrast, in cases where the odd-even judging signal 62 is set to a high level denoting "1", the odd-even judging signal 62 indicates an odd-numbered lateral line. When the start signal 63 sent from the CPU 2 is received in the odd-even judging signal 62, the odd-even judging signal 62 is set to the low level of "0" in the odd-even judging signal 62, and the level of the odd-even judging signal 62 is changed each time the output instructing signal 64 is received in the odd-even judging signal 62.

Also, in FIG. 5, 66 denotes a signal indicating the sample mode information input from the transfer parameter register group 10. 65 indicates the sub-sampling circuit for repeatedly receiving the four pieces of pixel data stored in the register 60 M times and producing 128-bit data from 4*M pieces of pixel data full-sampled or 2*M pieces of pixel data sub-sampled according to the sample mode information 66. 68 indicates a write control circuit for producing a write control signal according to the sample mode information 66 to control a plurality of registers of the sub-sampling circuit 65. 67 indicates an 5 output control circuit for outputting the 128-bit data produced in the sub-sampling circuit 65 to the data bus in response to the output instructing signal 64 sent from the timing control unit 11.

Figure 6:
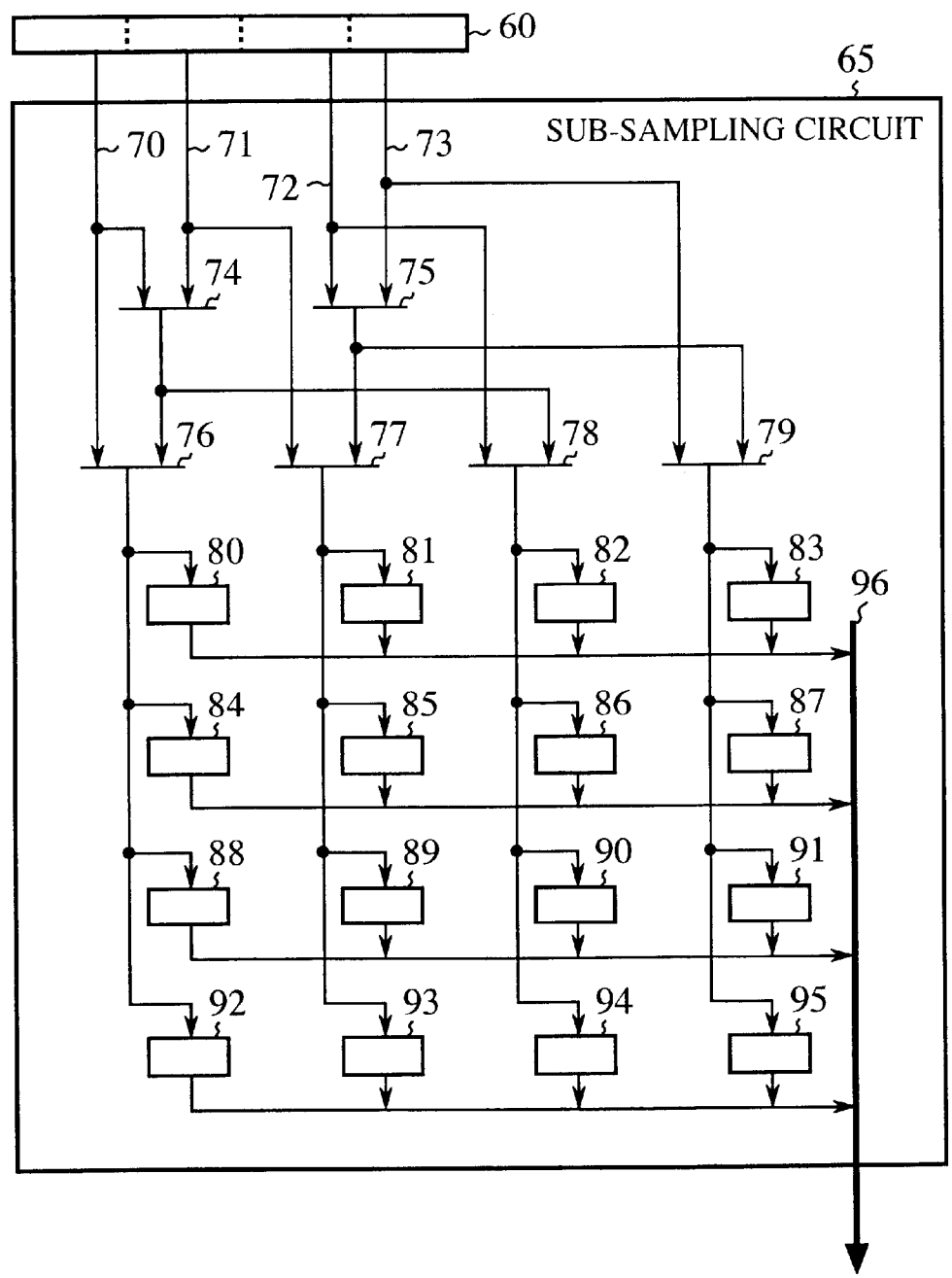
FIG. 6 is a block diagram showing the configuration of a sub-sampling circuit of the direct memory access transfer apparatus according to the first embodiment of the present invention.

FIG. 6 is a block diagram showing the configuration of the sub-sampling circuit 65. As shown in FIG. 6, four pieces of 8-bit pixel data of four pixels are stored in the register 60 having 32-bit length. The first pixel data is input to a signal line 70, the second pixel data is input to a signal line 71, the third pixel data is input to a signal line 72, and the fourth pixel data is input to a signal line 73. 74 indicates a selector for selecting the first pixel data or the second pixel data, and 75 indicates a selector for selecting the third pixel data or the fourth pixel data. The selection in each of the selectors 74 and 75 depends on the odd-even judging signal (not shown) produced in the odd-even judging circuit 62.

76 indicates a selector for selecting the first pixel data of the signal line 70 or the pixel data selected in the selector 74, 77 indicates a selector for selecting the second pixel data of the signal line 71 or the pixel data selected in the selector 75, 78 indicates a selector for selecting the third pixel data of the signal line 72 or the pixel data selected in the selector 74, and 79 indicates a selector for selecting the fourth pixel data of the signal line 73 or the pixel data selected in the selector 75. The selection in each of the selectors 76 to 79 depends on the sample mode information 66 (not shown) sent from the transfer parameter register group 10. 80 to 95 respectively indicate a register, having 8-bit length, for storing the pixel data selected in one of the selectors 76 to 79. 96 indicates a signal line through which the 16 pieces of 8-bit pixel data of the registers 80 to 95 are output as 128-bit data. In this case, the 128-bit data is produced by serially arranging the pieces of pixel data in the order of data of the register 80, data of the register 81,—and data of the register 95.

Next, an operation of the sub-sampling circuit 65 is described.

The case where the sample mode information 66 sent from the transfer parameter register group 10 indicates the sub-sampling is initially described. When the value of the odd-even judging signal is set to "0", the first pixel data of the signal line 70 is selected in the selector 74, and the third pixel data of the signal line 72 is selected in the selector 75. In contrast, when the value of the odd-even judging signal is set to "1", the second pixel data of the signal line 71 is selected in the selector 74, and the fourth pixel data of the signal line 73 is selected in the selector 75.

Because the sample mode information 66 indicates the sub-sampling, the pixel data output from the selector 74 is selected in the selectors 76 and 78, and the pixel data output from the selector 75 is selected in the selectors 77 and 79. Therefore, one set of four pieces of pixel data stored in the register 60 is input to the sub-sampling circuit 65 for every set, and a set of two pieces of pixel data sub-sampled at the sample ratio of 2:1 according to the quincunx method is output from both a set of the selectors 76 and 77 and a set of the selectors 78 and 79.

Thereafter, each set of two pieces of pixel data, which is sub-sampled from the corresponding set of four pieces of pixel data stored in the register 60, is stored in a set of two registers according to the write control signal (not shown) output from the write control circuit 68. That is, two pieces of pixel data sub-sampled from the first set of four pieces of pixel data of the register 60 are respectively stored in the register 80 and the register 81, two pieces of pixel data sub-sampled from the second set of four pieces of pixel data of the register 60 are respectively stored in the register 82 and the register 83, - - - , and two pieces of pixel data sub-sampled from the eighth (corresponding to M=8) set of four pieces of pixel data of the register 60 are respectively stored in the register 94 and the register 95. When the pixel data is stored in each of the registers 80 to 95, 128 bit pixel data produced from the 16 pieces of 8-bit pixel data of the registers 80 to 95 is output to the output control circuit 67.

Next, the case where the sample mode information 66 indicates the full sampling is described. The selectors 76 to 79 select four pieces of pixel data of the signal lines 70 to 73 respectively. Thereafter, each set of four pieces of pixel data stored in the register 60 is stored in a set of four registers according to the write control signal (not shown) output from the write control circuit 68. That is, the first set of four pieces of pixel data stored in the register 60 is stored in the four registers 80 to 83, the second set of four pieces of pixel data stored in the register 60 is stored in the four registers 84 to 87, - - - , and the fourth (corresponding to M=4) set of four pieces of pixel data stored in the register 60 is stored in the four registers 92 to 95. When the pixel data is stored in each of the registers 80 to 95, 128 bit pixel data produced from the 16 pieces of 8-bit pixel data of the registers 80 to 95 is output to the output control circuit 67.

Accordingly, because the DMA transfer apparatus 1 is operated as is described above, pieces of pixel data output from the sender's memory 3 can be sub-sampled at one time at the sample ratio of 2:1 according to the quincunx method. Therefore, the pieces of sub-sampled pixel data can be transferred to the receiver's memory 4 at a high speed.

Also, because the pieces of pixel data read out from the sender's memory 3 are sub-sampled in the sub-sampling circuit shown in FIG. 6, the pieces of pixel data read out from the sender's memory 3 can be transferred to the receiver's memory 4 at a high speed.

Figure 11:
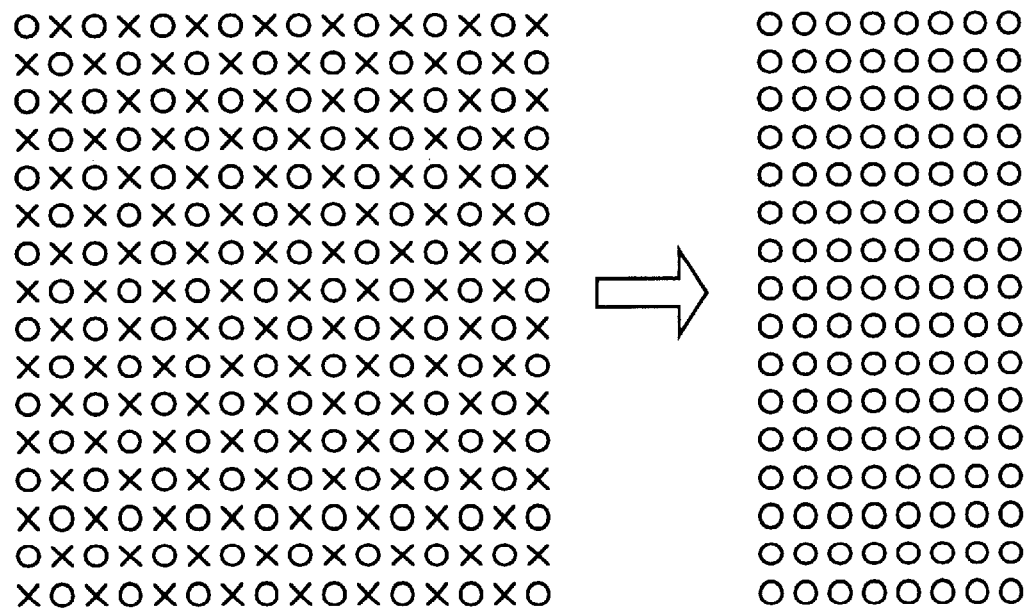
FIG. 11 is a conceptual view showing a sub-sampling performed at the sample ratio of 2:1 according to a quincunx method.

In this embodiment, as shown in FIG. 11, the quincunx method of the sample ratio of 2:1 is adopted as a sub-sampling method. However, it is applicable that another method of the sample ratio of 2:1 be used. For example, as shown in FIG. 7A, it is applicable that pieces of pixel data, each of which is not sampled in the quincunx method shown in FIG. 11, be sub-sampled. Also, as shown in FIG. 7B, it is applicable that the positions of pixels corresponding to the sub-sampling be changed for every two lateral lines. In cases where the pixels are arranged in a field structure, this sampling method agrees with the quincunx method. Also, as shown in FIG. 7C, it is applicable that pieces of data of pixels arranged on every other longitudinal row be sub-sampled.

Also, in this embodiment, pieces of pixel data are sub-sampled at the sample ratio of 2:1. However, it is applicable that pieces of pixel data be sub-sampled at an arbitrary sample ratio of n:1 (n is an integral number higher than 1). For example, as shown in FIG. 8A, it is applicable that pieces of data of pixels arranged in specific longitudinal rows be sub-sampled at the sample ratio of 4:1. Also, as shown in FIG. 8B, it is applicable that longitudinal rows corresponding to the sub-sampling at the sample ratio of 4:1 be changed every lateral line.

Figure 9:
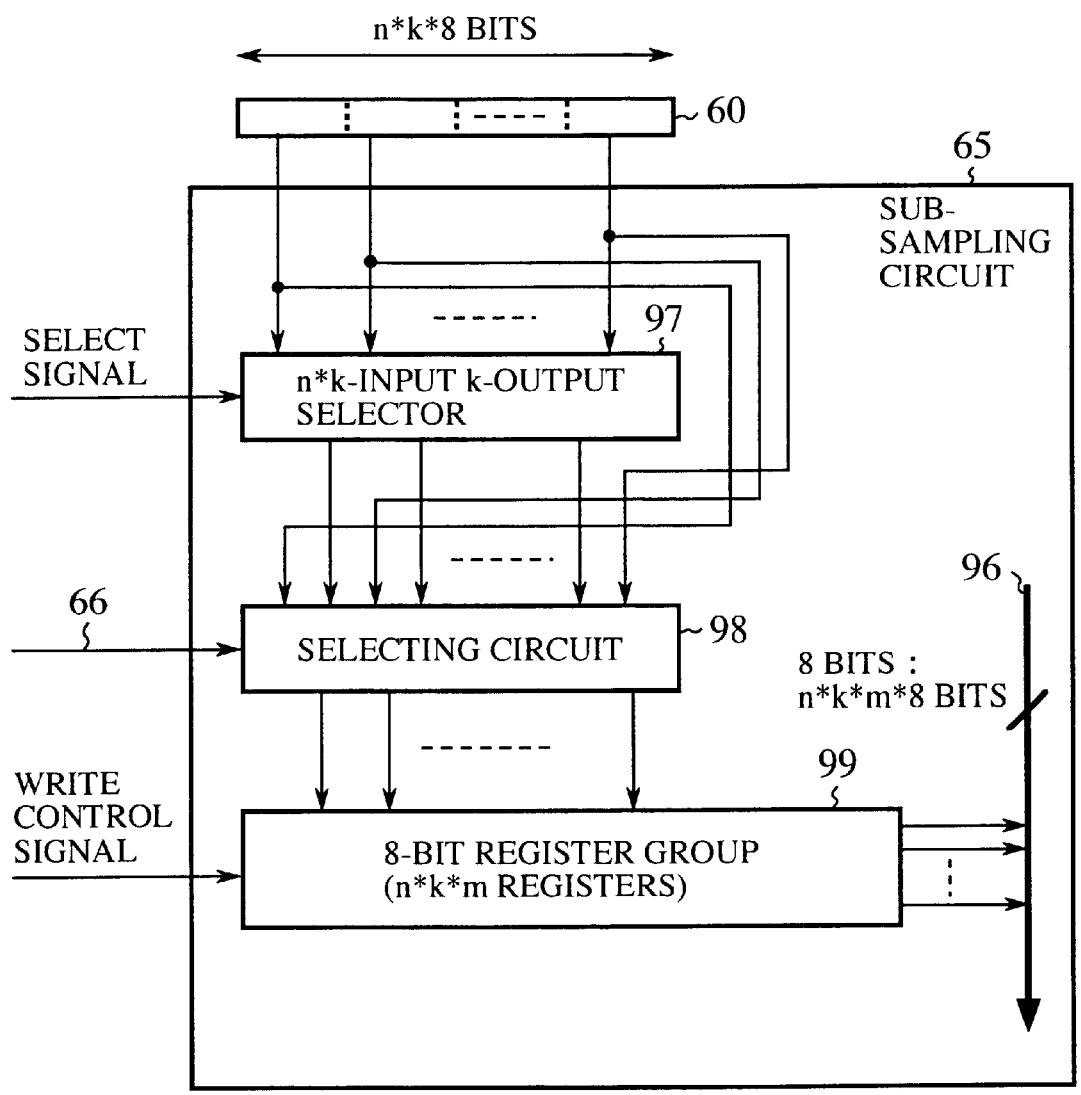
FIG. 9 is a block diagram showing the configuration of a sub-sampling circuit of the direct memory access transfer apparatus according to a modification of the first embodiment of the present invention.
Figure 10:
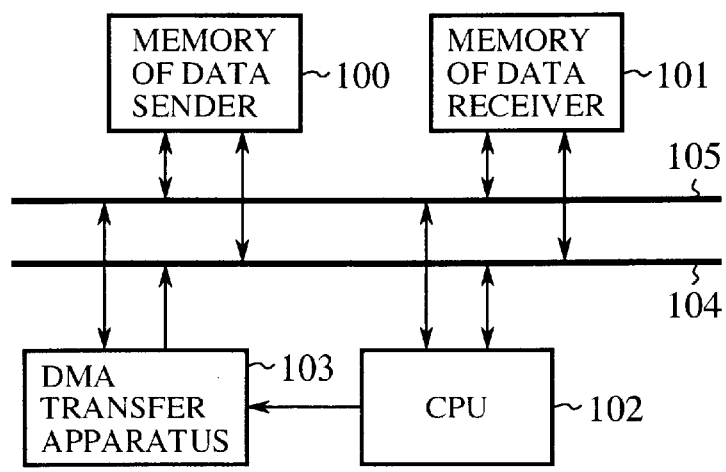
FIG. 10 is a block diagram showing the configuration of a picture processing system having a conventional direct memory access transfer apparatus.

FIG. 9 is a block diagram showing the configuration of the sub-sampling circuit 65 in which a sub-sampling is performed at the sample ratio of n:1. In this example, n*k pieces of pixel data (corresponding to one word) output from the sender's memory 3 to the data bus 5 have a data length of n*k*8 bits (k is an integral number higher than 0), and data input from the data bus 5 to the receiver's memory 4 has a data length of n*k*m*8 bits (m is an integral number higher than 0). Here, the symbol "k" denotes the number of sample pixels existing in one word, and the symbol "m" denotes a constant used to determine the number W of words existing in one lateral line.

In FIG. 9, 60 indicates a register having n*k*8-bit length. 97 indicates an n*k-input k-output selector for performing a sub-sampling at the sample ratio of n:1 according to a select signal sent from a select signal producing circuit (not shown) corresponding to the odd-even judging circuit 62. 98 indicates a selector circuit for outputting k pieces of pixel data of the selector 97 in case of the sub-sampling and outputting n*k pieces of pixel data stored in the register 60 as it is in case of the full sampling. 99 indicates an 8-bit register group, composed of n*k*m registers, for outputting n*k*m pieces of pixel data under the control of the write control signal sent from the write control circuit 68.

Readout addresses of the sender's memory 3 in the case of the sample ratio of n:1 are produced according to an equation (3).

$$A_{st}=Ak+W*t+n*k*s$$

$$(s=0 \text{ to } M-1, t=0 \text{ to } N-1) \qquad (3)$$

Here, M=m is satisfied in case of the full sampling, and M=m*n is satisfied in case of the sub-sampling. Also, the readout address Ast is increased by n*k for each address renewal in the same lateral line, and the readout address Ast is increased by (W−n*k*(M−1)) in case of the address renewal to a next lateral line.

Also, a write address Ay of the receiver's memory 4 for a y-th lateral line corresponding to the current transfer is produced according to an equation (4).

$$A_y=Ad+n*k*m \ (y=0 \text{ to } N-1) \qquad (4)$$

A select signal corresponding to a lateral line, of which pieces of pixel data are currently transferred, is output from the select signal producing circuit corresponding to the odd-even judging circuit 62 to the n*k-input k-output selector 97. That is, when an output instructing signal 64 sent from the timing control unit 11 is received in the select signal producing circuit, the select signal output from the select signal producing circuit is changed to another select signal corresponding to a next lateral line. Thereafter, a write control signal is output from the write control circuit 68 to the 8-bit register group 99 to write pieces of pixel data to n*k registers respectively for each word stored in the register 60 in case of the full sampling and to write k pieces of sub-sampled pixel data to k registers respectively for each word stored in the register 60 in case of the sub-sampling. When n*k*m pieces of pixel data or n*k*m pieces of sub-sampled pixel data are stored in all the n*k*m registers of the 8-bit register group 99 respectively, data having a data length of n*k*m*8 bits is output to the output control circuit 67 through the signal line 96.

As is described above, in the first embodiment, in cases where the accessing of pieces of pixel data to each of the sender's memory 3 and the receiver's memory 4 is possible at one time, two-dimensional readout addresses of the sender's memory 3 are produced in the sender-memory control unit 7, pieces of pixel data of pixels of a rectangular area are read out from the sender's memory 3 one after another in a prescribed scanning order according to the two-dimensional readout addresses, the pieces of pixel data read out from the sender's memory 3 are sub-sampled at the sample ratio of n:1 in a direction of each lateral line in the data transforming unit 9, two-dimensional write addresses of the receiver's memory 4 are produced in the receiver-memory control unit 8, and pieces of pixel data sub-sampled in the data transforming unit 9 are written in the receiver's memory 4 according to the write addresses. Accordingly, the pieces of pixel data of the sender's memory 3 can be sub-sampled and transferred to the receiver's memory 4 at a high speed in the DMA transfer apparatus 1.

Also, in the first embodiment, in cases where the pieces of pixel data are sub-sampled according to the quincunx method, because positions of pixels corresponding to pieces of sub-sampled pixel data in one lateral line are changed for every lateral line, the sub-sampling of pieces of pixel data of pixels placed at fixed longitudinal rows can be prevented in the DMA transfer apparatus 1.

What is claimed is:

1. A direct memory access transfer apparatus, in which pieces of pixel data are transferred between a sender's memory, to which the accessing of pieces of pixel data is possible at one time, a receiver's memory to which the accessing of pieces of pixel data is possible at one time, comprising:

a group of transfer parameter registers for storing a plurality of parameters required to transfer pieces of pixel data both the sender's memory and the receiver's memory;

a sender-memory control unit for producing a plurality of two-dimensional readout addresses of the sender's memory according to the parameters stored in the group of transfer parameter registers and reading out pieces of pixel data corresponding to pixels arranged on a plurality of lateral lines of a rectangular area from the sender's memory according to the two-dimensional readout addresses of the sender's memory;

a data transforming unit for performing a sub-sampling for the pieces of pixel data of each lateral line read out from the sender's memory by the sender-memory control unit at a sample ratio of n:1 (n is an integral number higher than 1) and outputting pieces of sub-sampled pixel data corresponding to each lateral line;

a receiver-memory control unit for producing a plurality of two-dimensional write addresses of the receiver's memory according to the parameters stored in the group of transfer parameter registers and write the pieces of sub-sampled pixel data of the lateral lines produced by the data transforming unit in the two-dimensional write addresses of the receiver's memory; and a timing control unit for controlling a processing timing of the sender-memory control unit, a processing timing of the data transforming unit and a processing timing of the receiver-memory control unit.

2. A direct memory access transfer apparatus according to claim 1, wherein the sub-sampling is performed by the data transforming unit according to a quincunx method in which positions of pixels corresponding to the pieces of sub-sampled pixel data of each even-numbered lateral line differ from those corresponding to the pieces of sub-sampled pixel data of each odd-numbered lateral line.

3. A direct memory access transfer apparatus according to claim 1, wherein sample mode information indicating the performance of a sub-sampling or a full sampling for the pieces of pixel data read out from the sender's memory is stored in the group of transfer parameter registers, and the sub-sampling or the full sampling is performed for the pieces of pixel data read out from the sender's memory by the data transforming unit according to the sample mode information stored in the group of transfer parameter registers.

4. A direct memory access transfer apparatus according to claim 1, wherein the sender-memory control unit comprises an address calculating circuit for calculating each of the readout addresses of the sender's memory according to the parameters stored in the group of transfer parameter registers;

a register for storing the readout addresses calculated in the address calculating circuit; and an output control circuit for outputting the readout addresses stored in the register and a readout signal, which indicates the readout of the pieces of pixel data stored in the sender's memory, according to an instruction sent from the timing control unit.

5. A direct memory access transfer apparatus according to claim 1, wherein the receiver-memory control unit comprises an address calculating circuit for calculating each of the write addresses of the receiver's memory according to the parameters stored in the group of transfer parameter registers;

a register for storing the write addresses calculated in the address calculating circuit; and an output control circuit for outputting the write addresses stored in the register and a write signal, which indicates the writing of the pieces of sub-sampled pixel data produced by the data transforming unit, according to an instruction sent from the timing control unit.

6. A direct memory access transfer apparatus according to claim 3, wherein the data transforming unit comprises a register for storing the pieces of pixel data read out from the sender's memory according to an instruction sent from the timing control unit;

a sub-sampling circuit for performing the sub-sampling or the full sampling for the pieces of pixel data stored in the register according to the sample mode information stored in the group of transfer parameter registers to produce pieces of sampled pixel data and transforming the pieces of sampled pixel data into a piece of a combined pixel data corresponding to the lateral line according to an instruction sent from the timing control unit; and an output control circuit for outputting the combined pixel data of the lateral line transformed in the sub-sampling circuit according to an instruction sent from the timing control unit.

7. A direct memory access transfer apparatus according to claim 3, wherein the data transforming unit comprises a register for storing the pieces of pixel data read out from the sender's memory according to an instruction sent from the timing control unit;

an odd-even judging circuit for judging according to an instruction sent from the timing control unit whether the lateral line of the pixels in the rectangular area is an odd-numbered line or an even-numbered line;

a sub-sampling circuit for performing the sub-sampling for the pieces of pixel data stored in the register in a quincunx method according to a judging result obtained in the odd-even judging circuit and the sample mode information stored in the group of transfer parameter registers to produce pieces of sampled pixel data and transforming the pieces of sampled pixel data into a piece of a combined pixel data corresponding to the lateral line according to an instruction sent from the timing control unit; and an output control circuit for outputting the combined pixel data of the lateral line transformed in the sub-sampling circuit according to an instruction sent from the timing control unit.

8. A direct memory access transfer apparatus according to claim 1, wherein the sub-sampling is performed by the data transforming unit according to a quincunx method to place pixels corresponding to the pieces of sub-sampled pixel data of one group of lateral lines at even-numbered positions on each lateral line and to place pixels corresponding to the pieces of sub-sampled pixel data of the other group of lateral lines at even-numbered positions on each lateral line.

* * * * *